UNITED STATES PATENT OFFICE.

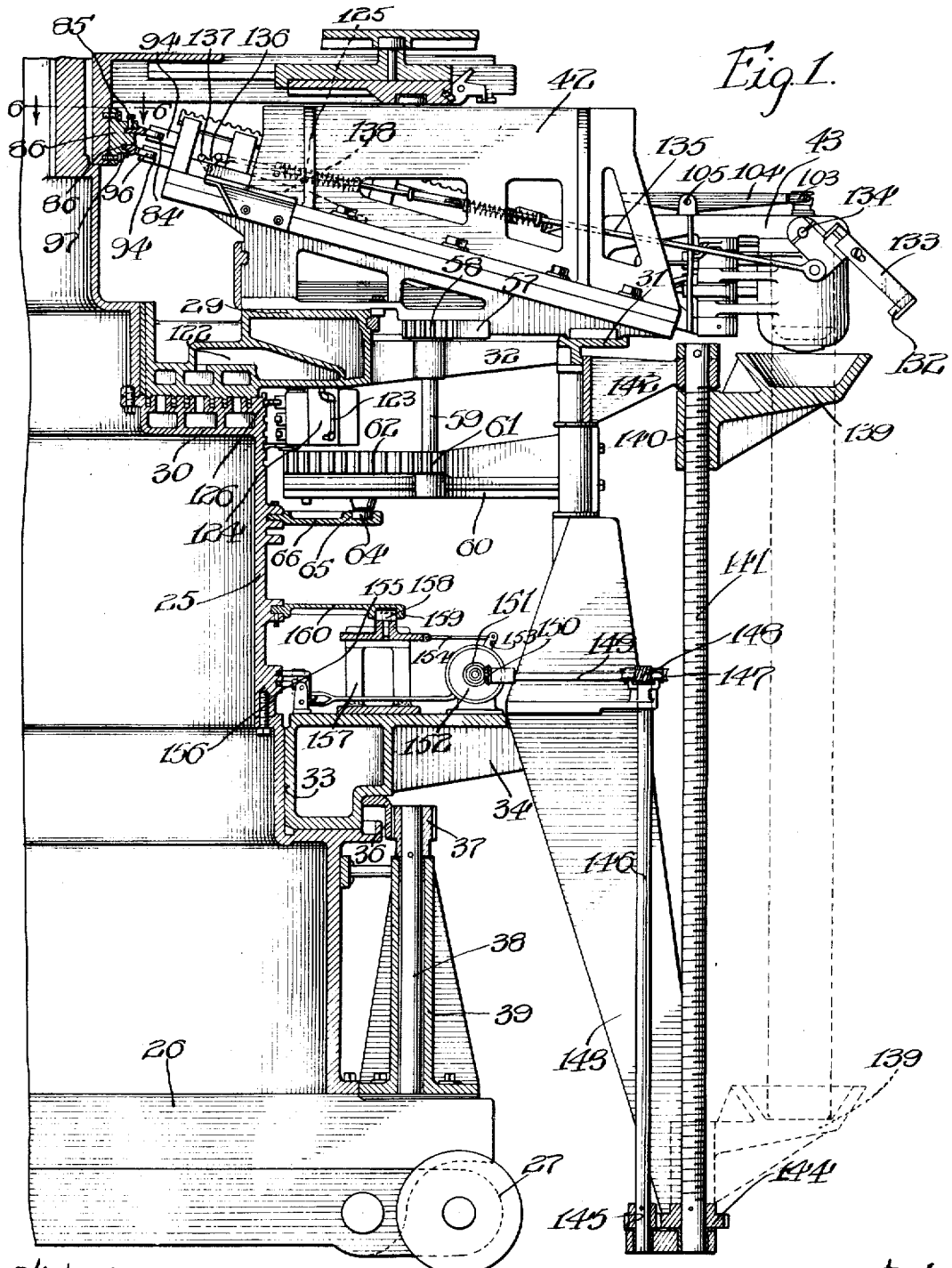

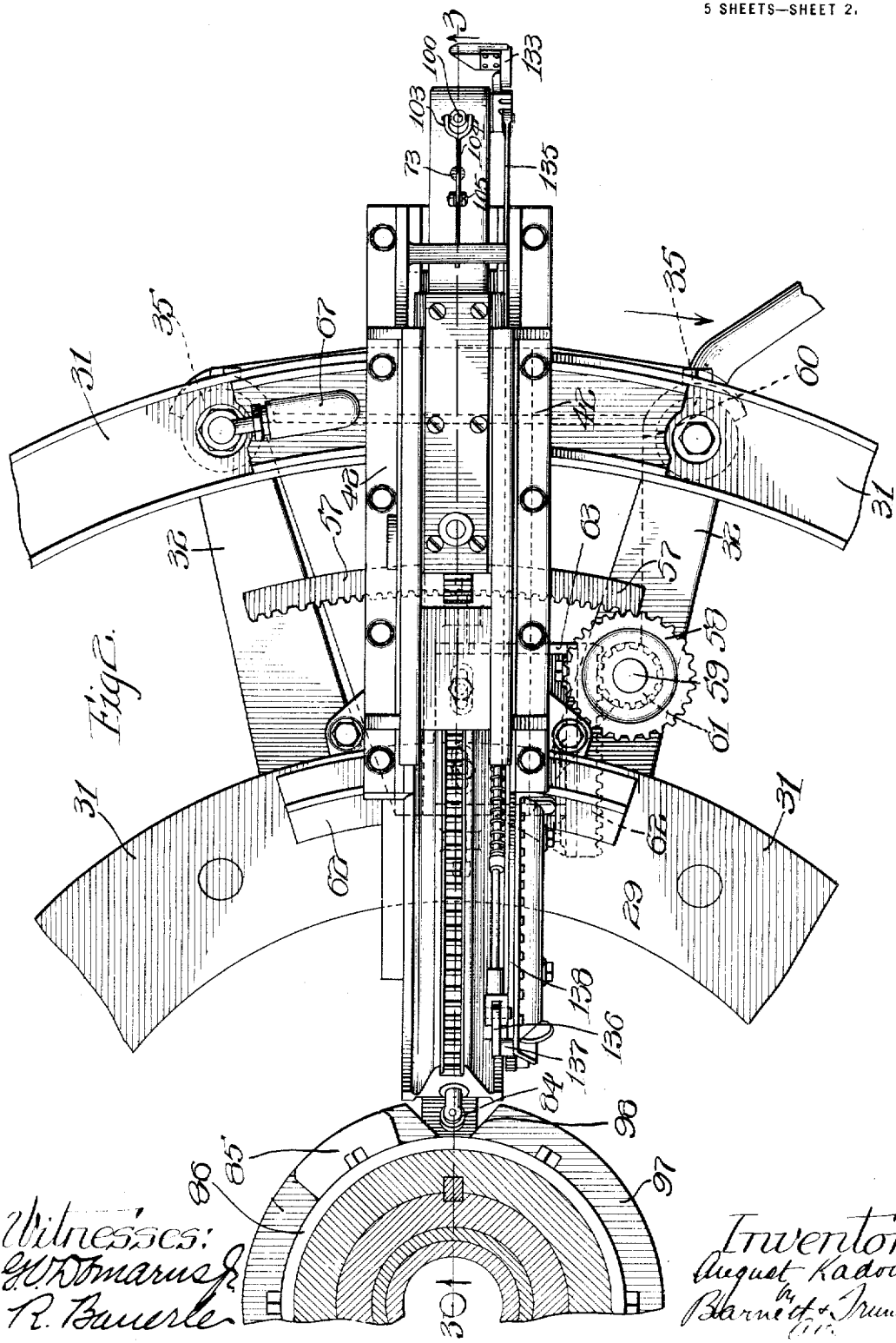

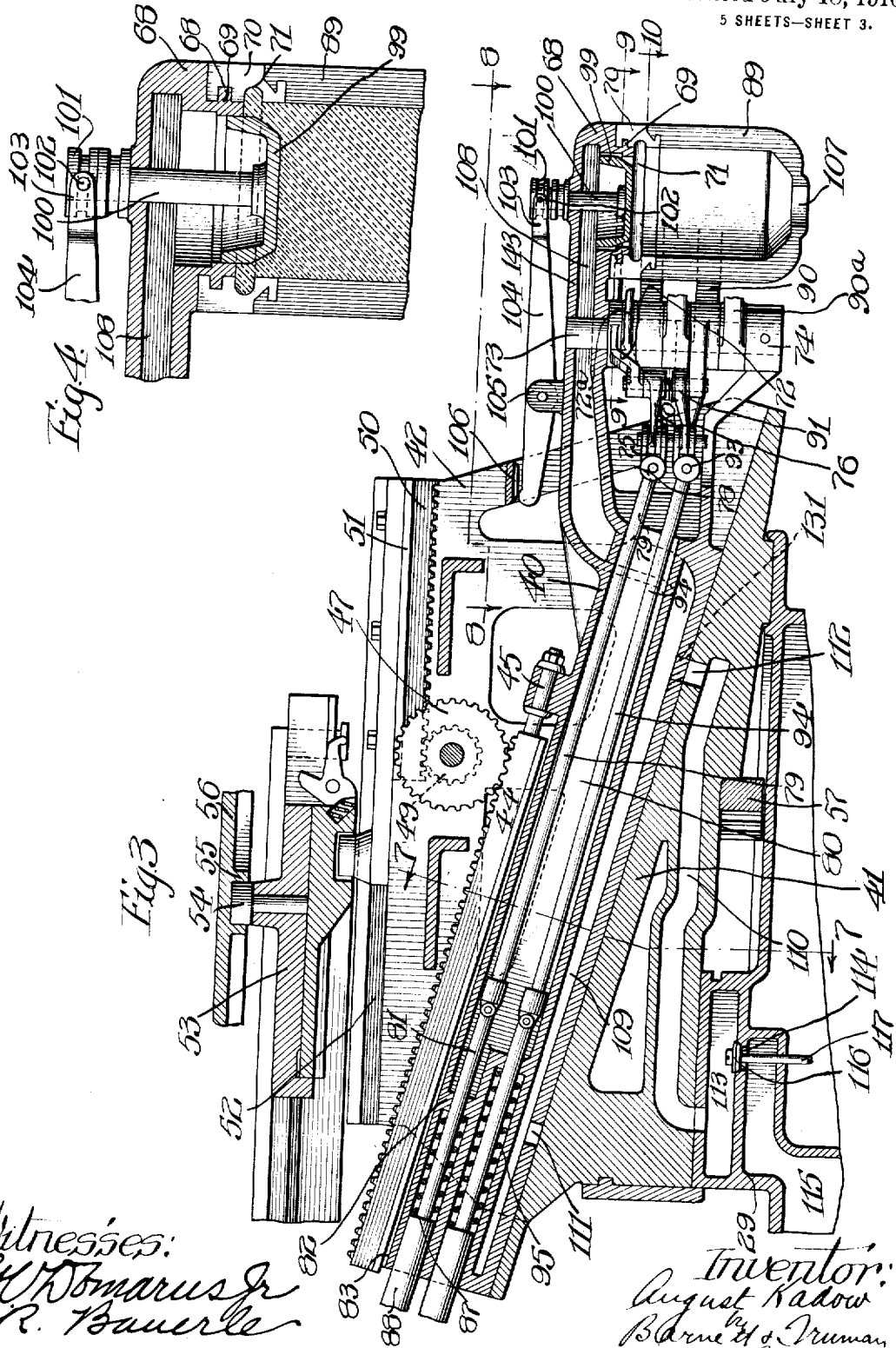

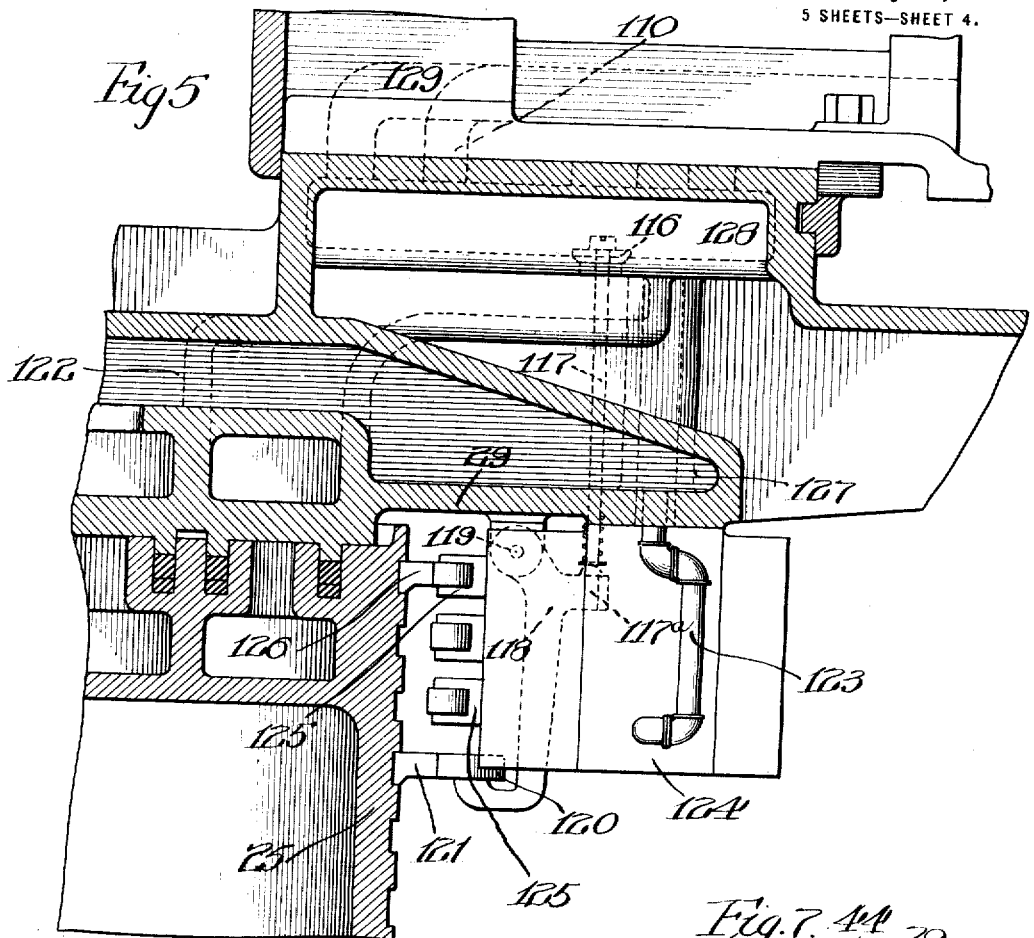
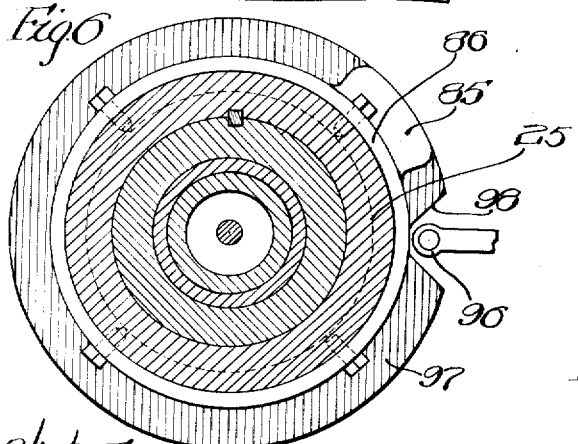
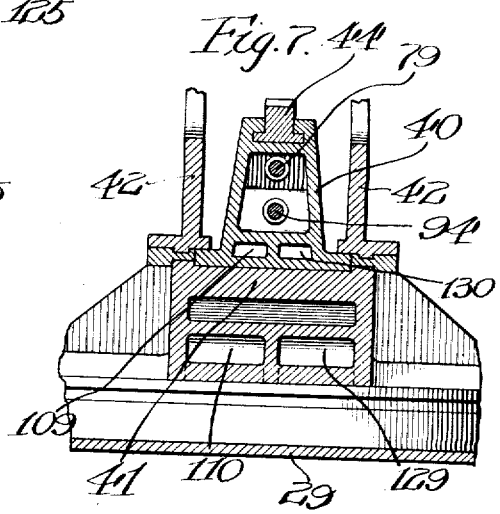

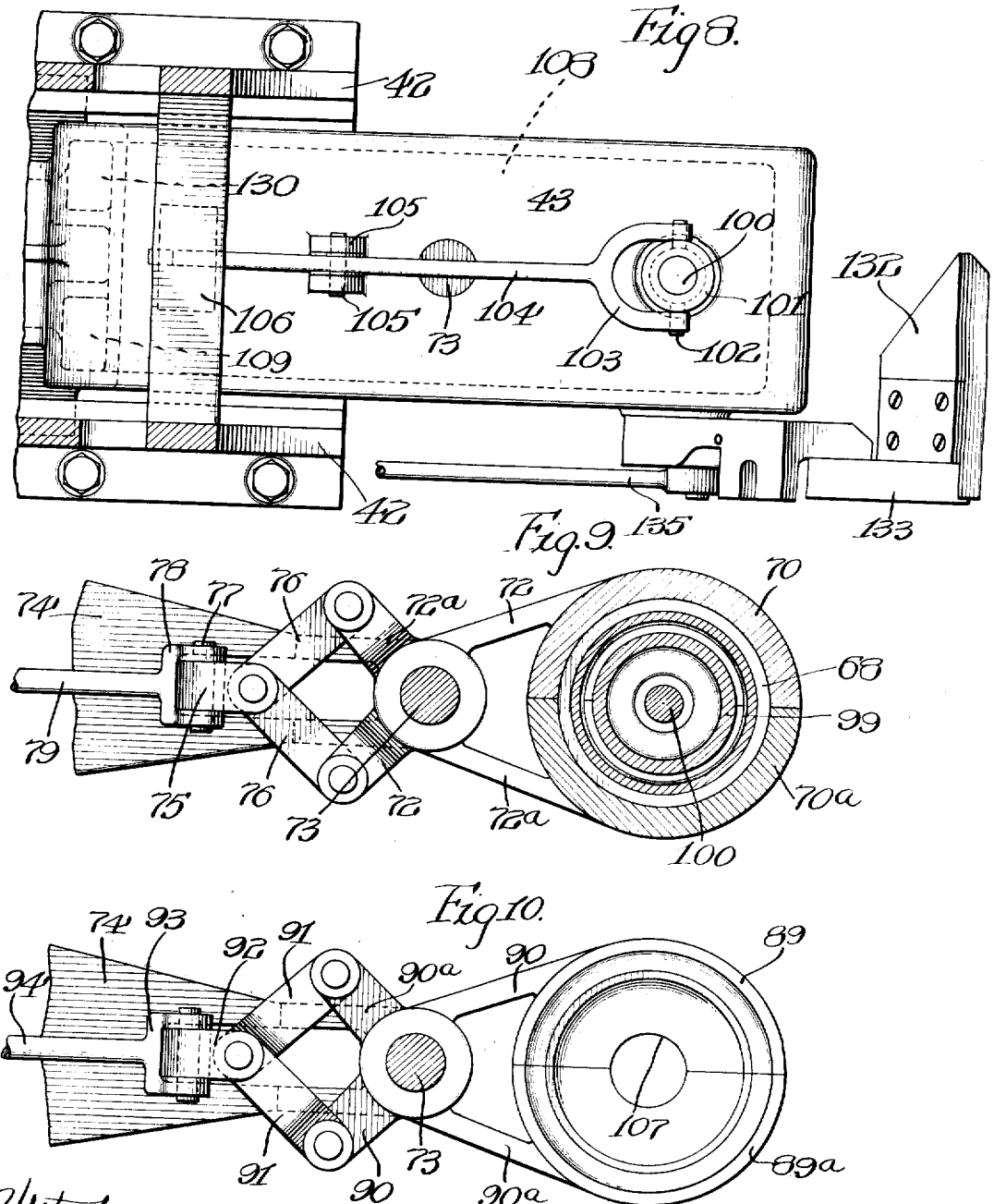

AUGUST KADOW, OF TOLEDO, OHIO, ASSIGNOR TO THE WESTLAKE MACHINE COMPANY, OF TOLEDO, OHIO, A CORPORATION OF OHIO.

MACHINE FOR MAKING GLASS CYLINDERS.

1,191,317.  Specification of Letters Patent.  Patented July 18, 1916.

Application filed September 11, 1912. Serial No. 719,864.

*To all whom it may concern:*

Be it known that I, AUGUST KADOW, a citizen of the United States, residing at Toledo, in the county of Lucas and State of Ohio, have invented certain new and useful Improvements in Machines for Making Glass Cylinders, of which the following is a specification.

My invention relates to the manufacture of glass, and particularly to the manufacture of glass cylinders which are subsequently cut and flattened out into sheets.

The principal object of the invention is to provide an improved machine for manufacturing glass cylinders by a series of automatically performed operations.

The invention has for further objects to provide a glass blowing machine consisting of the novel constructions, arrangements and devices shown in the accompanying drawings and which will be hereinafter described and claimed.

The invention is illustrated, in a preferred embodiment, in the accompanying drawings, in which—

Figure 1 is a sectional elevation showing one unit of a cylinder making machine constructed in accordance with my invention together with portions of the body of the machine; Fig. 2, a plan view of the apparatuses shown in Fig. 1, with certain parts omitted for the sake of clearness of illustration; Fig. 3, a radial sectional view taken on line 3—3 of Fig. 2, looking in the direction of the arrows; Fig. 4, a detail sectional view of the gathering mold; Fig. 5, a fragmentary radial sectional view illustrating the arrangement of certain air ducts and ports; Fig. 6, a sectional plan taken on line 6—6 of Fig. 1; Fig. 7, a sectional view on line 7—7 of Fig. 3, looking in the direction of the arrows; Fig. 8, a sectional plan taken on line 8—8 of Fig. 3, and Figs. 9 and 10 sectional plans of the gathering mold, taken on lines 9—9 and 10—10, respectively, of Fig. 3, Fig. 9 illustrating the construction of the neck molds and Fig. 10 that of the body molds.

Like characters of reference designate like parts in the several figures of the drawings.

*General organization of the machine.—*
The machine is made up of a number of identical units which are arranged on a framework that rotates about a drum. Each unit forms a cylinder of glass during each revolution around the drum. I have shown but one unit and enough of the rotating frame and of the drum to make the operation of the machine understood.

Each unit comprises what will be termed a ram which reciprocates on radial lines so as to be thrust into the working opening of a glass furnace at a certain point in the revolution of the unit. The ram carries a gathering mold which gathers a charge of molten glass from the furnace. Mechanism is provided whereby the angular movement of the ram is stopped while the gather is being made without, however, stopping the rotation of the frame of the machine, which is continuous during the entire period the machine is in operation. After the gathering mold has been withdrawn from the furnace the lower portions of the mold—which is made in sections—are removed from the gather and compressed air is admitted through the ram to the top of the mold and this expands the blank in the form of a tube or cylinder, gravity aiding the air in producing the elongation of the blank. The unit comprises further a support for the lower end of the blank and mechanism operating automatically to lower the support as the elongation of the blank proceeds. When the cylinder is complete the mold elements which have held the top of the blank during the operation of blowing and elongating are automatically released so that the cylinder may be removed from the machine.

Referring to the drawings, 25 designates the drum which is preferably supported on a truck 26 provided with wheels 27 which run upon a track 28 which is preferably in line with the working opening of the glass furnace (not shown). The rotating frame comprises an annular member 29 provided with certain air passages communicating with corresponding passages in the annular portion 30 of the drum, an outer ring 31 connected with the inner ring by the webs 32, and a lower ring 33, provided with the radial webs 34, connected with the ring 31 by the columns 35.

The working units of the machine are arranged on the rotating frame preferably one unit between each pair of webs 32. The rotating frame is driven in any suitable manner. I have shown a circular rack 36 secured to the ring 33 and meshed by a pinion 37 on a shaft 38 mounted in bearings 39 on the truck 26. Any suitable form of motor may be employed for driving the shaft.

*The ram.*—The ram 40 is arranged to slide radially of the machine upon the inclined surface of a carriage 41 which latter is mounted upon the rotating frame of the machine so as to be capable of moving angularly or circumferentially thereon. The carriage is provided with a housing 42 which partially incloses the ram. The ram terminates in a nose piece 43 to which the gathering mold is secured.

The ram is reciprocated, so as to move the gathering mold into and out of the working opening of the furnace, by the following mechanism: 44 is a rack provided with a stud 45 which is secured to a lug 46 on the top of the ram. This rack is meshed by a pinion 47 carried on a shaft 48 revolubly mounted in the housing 42. On the same shaft is a smaller pinion 49 which is meshed by a rack 50 on a slide 51 mounted in guide slots 52 in the housing 42. Connected with the slide 51, by certain devices shown in Fig. 3 but which need not be described as they form no part of the present invention, is a plate 53 on which is mounted a roller 54 traveling in a cam groove 55 in the cam plate 56. The configuration of the cam groove 55 is such as to cause the slide 51 to be moved inwardly —that is to say, toward the axial center of the machine—at the moment the ram is brought, by the rotation of the machine, in line with the working opening of the furnace. This rotates the pinions 47, 49 counterclockwise which thrusts the ram outwardly so as to bring the gathering mold, it will be understood, into contact with the glass in the furnace. The cam groove 55 is concentric with the axial center of the machine for a short distance and during this period the mold stands still and the gather is made. The cam groove then bends outwardly which reverses the rack and pinion mechanism and withdraws the ram from the furnace, returning it to its original position with respect to the axis of the machine.

While the ram is being moved into and out of the furnace its carriage 41, instead of rotating with the frame of the machine, is held stationary. The following mechanism is employed for accomplishing this result. On the under side of carriage is an arcuate rack 57 meshed by a pinion 58 on a shaft 59 mounted in bearings in one of the radial webs 32 of the rotating frame and in a casting 60 which is bolted to the columns 35. On the lower end of the shaft 59 is a pinion 61 which is meshed by a rack 62 carried on a slide 63 movable radially of the machine in suitable guides formed on the casting 60. On the under side of the slide 63 is mounted a roller 64 which travels in a cam groove 65 in a cam plate 66 bolted to the stationary drum 25. As the rotation of the machine in the direction indicated by the arrow in Fig. 2 brings the ram opposite the working opening of the furnace the cam groove 65 takes an inward bend which draws the slide 63 toward the center of the machine and by rotating the pinions 61, 58 counterclockwise moves the ram carriage and the ram backward on the rotating frame, that is, in the direction opposite to that in which the frame is rotating. It will be understood that at the beginning of this movement the relative position of the racks 57, 62 and pinions 58, 61 is the reverse of that shown in Fig. 2. At the end of the movement they have reached the positions shown in this figure. This mechanism is so constructed that the ram carriage and ram are moved backwardly at the same speed that the rotating frame is moved in the other direction. Hence the ram has no angular movement during the gathering period. Preferably a bumper 67 is secured to the ring 31 in position to limit the backward movement of the ram carriage. The ram retains the angular position on the frame which is shown in the full lines in Fig. 2 during the operation of forming the cylinder. To this end the cam groove 65 for a time runs concentric with the axis of the machine. After the cylinder has been discharged the cam groove 65 takes an outward bend which reverses the rack and pinion mechanism and moves the ram carriage and ram to their initial position on the frame.

*The gathering mold.*—The gathering mold receives a charge of glass from the glass furnace. The upper part of the mold retains its hold upon the body of glass during the operation of forming the same into a hollow cylinder. As a matter of convenience this element as a whole has been called the gathering mold but it will be understood that it also performs the function of securing the blank to the end of the ram which latter, during the blowing operation, constitutes, in effect, a blow pipe.

The nose portion 43 of the ram is formed with a depending neck 68 preferably formed with the rib 69. The semicircular neck mold elements 70, 70ᵃ closely fit the neck 68 and are preferably formed with the internal grooves 71. The mold elements 70, 70ᵃ, are supported on bell cranks 72, 72ᵃ which are mounted on a pintle 73 fixed at one end in the nose of the ram and at the other end to a bracket 74 formed on the ram. The other arms of the bell cranks are connected to a yoke 75 by means of the links 76, the yoke being pivotally mounted on a pin 77 carried in a fork 78 at the end of a rod 79 which extends through an opening 80 in the ram. The rod 79 has a jointed connection with a slide 81 guided in the webs 82, 83 and carrying at its inner end a roller 84 adapted to bear against a cam 85 secured to a ring 86

(Fig. 1) which forms a part of the stationary drum 25. A spring 87 intervenes between the web 82 and the enlarged portion 88 of the rod 81. When the rod 81, 79 is forced outwardly by contact of the roller 84 with the cam 85 the neck molds are opened, the spring 87 being compressed. It will be seen, by reference to Figs. 2 and 6, that the neck mold remains closed all the time except for a short period while roller 84 is in contact with the cam 85. The cam is so placed that the opening of the neck mold takes place after the cylinder is completed and before the ram again comes into line with the working opening of the furnace.

The body molds 89, 89ª are similarly supported on the bell cranks 90, 90ª pivoted on the pintle 73 and connected by the links 91 with a yoke 92 pivotally mounted in the fork 93 on the end of the jointed rod 94 which is in all respects the same as the rods 79, 81 that operates the neck molds. The rod 94 operates against a spring 95 and carries on its inner end the roller 96 which bears upon a cam 97. The cam 97 is a circular cam of uniform width except for a notch 98. When the roller 96 rides into the notch 98 the spring 95 operates to close the body molds. The molds are closed only during the period that the ram is thrust into and withdrawn from the furnace. During this period the ram carriage remains stationary instead of traveling with the rotating frame of the machine. As soon as the ram carriage again begins to travel with the machine the roller 96 rides out of the notch 98 and the body molds are opened. The gather is now suspended from the neck molds and the operation of forming the cylinder is commenced. Preferably the mold comprises, in addition to the neck mold elements and the body mold elements, a movable top mold element which is let down into the space between the neck molds before the gathering operation commences and is raised just before the compressed air is admitted into the blank.

The top mold, designated 99, is carried on a stem 100 which passes through the nose 43 of the ram and is provided at its upper end with a grooved collar 101 into which project pins 102 carried on the forked end 103 of a lever 104 pivotally mounted in a fork 105 on the ram. The other end of the lever is adapted to engage a cross piece 106 arranged at the lower or outer end of housing 42. When the ram is projected into the glass furnace the lever 104 is freed from the cross piece 106 and the top mold 99 drops from the position shown in Fig. 3 to that shown in Fig. 4. The glass is drawn up into the mold and fills in the annular space between the top neck mold elements. These parts being relatively cool and the body of the glass between the same comparatively thin, the latter is soon sufficiently congealed to support the gather and allow the body mold elements to be withdrawn. As the ram retreats from the furnace the short end of lever 104 comes against the cross piece 106 which rocks the lever and raises the mold element 99 to its original position. A cavity is left in the top of the gather which facilitates the starting of the blowing operation.

*Vacuum and compressed air ducts.*—The body mold elements are formed so as to provide a preferably circular opening 107 in the bottom of the mold. The glass from the glass furnace is sucked up into the mold through this opening. To this end the nose 43 of the ram is formed with a passageway 108 with which communicates a duct 109 running lengthwise of the ram (Figs. 3, 7 and 8). When the ram is in its extended position in the glass furnace the duct 109 is put in communication with a duct 110 in the ram carriage by means of a port 11 in the bottom of the ram and a port 112 in the carriage. The duct 110 in the carriage communicates with a chamber 113 formed in the annular member 29 of the rotating frame and this chamber communicates through a port 114 with a duct 115 from which the air is exhausted by some suitable form of exhausting apparatus (not shown). A valve 116 controls the port 114. The valve is on the end of a stem 117 (Fig. 5) which rests upon an arm 117ª of a rocking device 118 pivoted at 119 to the under side of the annular member 29. The rocking device 118 carries at its lower end a roller 120. The roller meets a cam 121 on the stationary drum 25 so as to raise the valve 116 and open the port 114 at the moment the mold on the end of the ram is brought into contact with the glass in the glass furnace.

The arrangement of ducts and ports for conducting compressed air to the mold is as follows: The annular member 29 is formed with an air chamber 122 which is kept supplied with compressed air at suitable pressure or pressures by instrumentalities which need not be described, as in themselves, they form no part of my present invention. The air from chamber 122 is conducted by a pipe 123 (Fig. 5) into a controlling and pressure regulating device the inclosing casing of which is shown at 124. The various valves of this mechanism are controlled by plungers 125 which are actuated by cams 126 on the drum 25, the purpose of the mechanism being to deliver to the blank different determinate pressures of air at different times. This mechanism is described and claimed in my co-pending application Serial No. 719,865 filed September 11, 1912. As the mechanism of itself forms no part of my present invention it will not be shown or described in detail in the present application. Any suitable valve mechanism might be employed for producing the necessary pressures at the proper times. It will be sufficient to say that the air admitted to the controlling mechanism 124 through the pipe 123 passes through a duct 127 into an air chamber 128 and thence through an air duct 129 formed in the ram carriage 41 to a duct 130 formed in the ram parallel to the exhaust duct 109; the compressed air duct 129 being formed with a port in line with the port 112 (Fig. 3) which communicates with a port 131 which is formed in the bottom of the ram and leads to the duct 130.

*The cut-off*.—The ram is preferably provided with mechanism for cutting off any surplus metal which may adhere to the mold when the gather is made. This device in itself forms no part of my present invention. In the drawings I have shown a cut-off mechanism substantially like that disclosed and claimed in my co-pending application Serial No. 719,866, filed Sept. 11, 1912.

It will be sufficient for the understanding of the operation of the present machine to state that a cut-off knife 132 is secured to a rocking member 133 which is pivoted to the ram at 134 and is swung back and forth by an operating rod 135 which is secured to a bell crank 136 pivoted on the ram, one arm of which carries a roller 137 which engages a cam 138 on the housing 42 when the ram makes its backward movement through the housing in being withdrawn from the furnace. The knife 132 is caused to pass across the bottom of the mold so as to shear therefrom any surplus metal if any there be.

*The cylinder support*.—The lower end of the body of glass operated upon is suported in a cup 139 which is lowered as the elongation of the blank proceeds. The cup 139 is formed with a threaded boss 140 through which extends a screw shaft 141, the upper end of which turns in a bearing formed on the bracket 142 secured to the columns 35, and the lower end in a bearing formed in the end of a casting 143. On the lower end of the shaft 141 is fixed a pinion 144 which is meshed by a pinion 145 on the end of a shaft 146 which carries a worm wheel 147 meshed by a worm 148 on a horizontal shaft 149. The latter carries a bevel pinion 150 meshed with a bevel pinion 151 on the shaft of an electric motor 152. Obviously any suitable means might be employed for rotating the shaft 141. As a matter of convenience I employ an electric motor of the Kimble type which has a controlling lever 153 that can be moved from one position to another to reverse the direction in which the armature of the motor is driven. When a motor of this sort is employed its controlling lever may be operated by a stationary cam on the drum 25 as shown in Fig. 1. The controlling lever 153 is connected by a link 154 with a slide 155 mounted in a slideway 156 formed in the casting 157 arranged on the annular member 33 of the rotating frame. Mounted on the slide 155 is a roller 158 which moves in a cam groove 159 formed in the cam plate 160 secured to the drum 25. When the motor is driven in one direction shaft 141 is rotated so as to lower the cup 139. The cam groove is so designed that this operation takes place shortly after the body mold elements have been removed from the gather and the compressed air admitted thereto. In Fig. 1 the operating lever 153 of the motor may be assumed to be in position to cause the motor to lower the cup. When the point in the rotation of the machine is reached after which the finished cylinder is discharged the cam groove 159 makes an inward bend which throws the lever 153 to a position at the left of that which it occupies in Fig. 1. This reverses the motor and returns the cup 139 to its upper position.

*Operation*.—The ram is brought opposite to the working opening of the furnace (not shown), the angular position of the ram with respect to the carriage being shown in Figs. 1 and 2. The cam actuated rack and pinion mechanism 50, 47, 49, 44, projects the ram into the furnace until the inlet port 107 of the gathering mold comes into contact with the surface of the molten glass in the furnace. The vacuum valve 116 is thereupon opened by its cam 121 and the air is exhausted from the various passages in the ram and from the mold causing glass from the furnace to be drawn up into the mold. The top mold element 99 is in its lower position—that shown in Fig. 4—and the glass is sucked up into the narrow annular passage between the top mold and the neck molds 70, 70ª. The ram is then withdrawn, by a reverse movement of the rack and pinion mechanism, and returned to its original position on the cam carriage 41. This reverse movement causes the cut-off knife 132 to pass across the lower end of the mold so as to cut off any surplus metal. The backward movement of the ram also brings the short end of lever 104 into contact with the cross piece 106 of the housing 42 and this lifts the top mold element 99. The vacuum valve 116 has been closed previous to this. During the reciprocatory movements of the ram the ram carriage is given an angular movement on the rotating frame of the same velocity as the movement of the frame but in the opposite direction, this movement being accomplished by means of the rack and pinion mechanism 62, 61, 58, 57. In other words, the ram is kept stationary during the gathering operation. In the meanwhile the rotating frame has, of course, continued its rotary movement so that when the ram is returned to its inner position the gathering mold is brought directly over the cup 139 which is in its upper position. Just before the ram carriage becomes stationary the roller 96 controlling the body mold elements rides into the notch 98 in the cam 97. The body mold elements previously held open by the cam 97 are closed and remain closed so long as the ram carriage remains stationary. As soon as the ram carriage starts to move with the rotating frame, which occurs after the gather has been made and the mold positioned over the cup 139—the roller 96 rides out of the notch 98 and opens the body molds. Compressed air is then admitted to the gather and the combined action of the air and of the gravity of the blank causes it to elongate in the form of a hollow cylinder. The end of the cylinder is supported by the cup 139 which is gradually lowered by the revolution of shaft 141 driven by the motor 151. Just before the cup 139 reaches the bottom of the shaft 141 the roller 84, which controls the opening and closing of the neck molds, meets the cam 85 and the neck molds are spread to release the cylinder. The cylinder is removed from the cup and shortly after this the configuration of the cam groove 159 causes the slide 155 to move inwardly which shifts the controlling lever 153 of the motor to a position that reverses the motor. The cup 139 is then returned to its initial position at the upper end of shaft 141 and the parts are in readiness for the formation of another cylinder.

The mechanism here shown but not claimed and particularly the gathering mechanism including the ram and its actuating mechanism, the air control mechanism and the cut-off mechanism are disclosed and claimed either in my co-pending applications Serial Nos. 719,865, 719,866 above referred to, or in my co-pending application Serial No. 570,621, filed July 6, 1910, or any divisions thereof, the present application being restricted specifically to the combination of devices for making glass cylinders as herein-described and claimed.

I claim:

1. The combination with means for automatically making a gather of glass comprising means for sustaining the upper end of said gather so that the gather may elongate by gravity, of means for automatically introducing air pressure into said gather in increasing volume as said gather elongates, a support arranged to receive the lower end of said gather only after it has partially elongated, and power driven means for thereafter lowering said support with the lower end of the gather thereon at a predetermined speed during the further elongation of the gather.

2. The combination with a gathering mold for making a gather of glass comprising means for sustaining said gather by its upper end so that the gather may elongate by gravity, of means for automatically opening the body of said mold at a predetermined time to relieve said gather hanging free from said supporting means, means for introducing air pressure into said gather during elongation, a support arranged to receive the lower end of the gather only after it has elongated to a predetermined extent, and power driven means for thereafter lowering said support with the lower end of said gather thereon at a predetermined speed during the further elongation and blowing of said gather.

3. The combination with means for automatically making a gather of glass comprising means for sustaining the upper end of said gather so that the gather may elongate by gravity, of means for automatically introducing air pressure into said gather in increasing volume as said gather elongates, a support arranged to receive the lower end of said gather only after it has partially elongated, power driven means for thereafter lowering said support with the lower end of the gather thereon at a predetermined speed during the further elongation of the gather, means for thereafter automatically releasing the upper end of said gather, and means for automatically reversing the movement of said support at a predetermined time after the upper end of said gather has been closed.

4. The combination with a central stationary support, of a frame constantly rotating around said support and means actuated by the travel of said rotating frame to gather and develop a body of glass in a predetermined recurring cycle of operations in regular time and order, comprising gathering mechanism provided with gathering molds for making a gather of glass, said molds comprising means for supporting the upper end of said gather when otherwise free from the support of said molds, means for forming an initial chamber in the upper end of said gather, means for admitting air under pressure into said gather as it elongates by gravity, a support arranged to receive the lower end of said gather only after it has elongated downwardly a certain distance, power driven means for thereafter lowering said support at a predetermined speed during the further elongation of the gather with the lower end of the gather supported thereon, and means for actuating said power driven means to lower said support during the elongation of the gather and to thereafter return said support to its original position.

5. The combination with a stationary support, of a rotating support arranged to constantly travel around the stationary support, means on said rotating support to engage the lower end of a gather after a certain amount of elongation by gravity, means for automatically lowering said gather support at a predetermined speed, and thereafter returning the same to its original position, in regular time and order, gathering mechanism on said rotating frame, means for periodically projecting said gathering mechanism into a furnace to make a gather of glass, means for arresting the angular travel of said gathering mechanism with the rotating frame during the gathering period without arresting the rotating frame, means for returning the gathering mechanism to its original position, in which position it is directly above the gather support, means for supporting the upper end of the gather during elongation, means for releasing the body in the lower end of the gather whereby it is permitted to elongate by gravity until it contacts with said gather support, and means for admitting air under pressure into the gather during elongation.

6. The combination with automatically actuated suction molds comprising means for supporting the upper end of the gather of glass gathered therein, of power driven means actuated in regular time and order and at a predetermined speed to engage the lower end of the gather only after a predetermined elongation by gravity, and to thereafter descend at such predetermined speed so as to support the lower end of the gather during elongation without retarding such elongation to such extent as to distort the gather, and means for automatically admitting air under pressure into the gather during elongation.

7. The process of making glass cylinders and similar articles, which comprises gathering a body of molten glass by suction into inclosing metal molds, whereby the entire surface of the gather is chilled, supporting the upper end of the gather and releasing the body thereof whereby the gather hangs free and will elongate by gravity, automatically admitting air under pressure into the gather during elongation, engaging the lower end of the gather by mechanical support after a predetermined elongation, and thereafter lowering said mechanical support while supporting the lower end of the gather at such predetermined regular speed as shall prevent too rapid elongation by gravity but without retarding such elongation so as to distort the gather and simultaneously admitting air under pressure in such volume as is necessary to develop the gather in desired form.

8. In a machine for making glass articles, the combination with a reciprocating ram, of a mold carried thereon comprising an upper mold element, a lever on one end of which said upper mold element is sustained, and a cam against which the other end of said lever is brought by the movement of said ram whereby the lever is rocked and said top mold element raised.

AUGUST KADOW.

Witnesses:
GEORGE E. DIXON,
L. F. LUSCOMBE.

port, means on said rotating support to engage the lower end of a gather after a certain amount of elongation by gravity, means for automatically lowering said gather support at a predetermined speed, and thereafter returning the same to its original position, in regular time and order, gathering mechanism on said rotating frame, means for periodically projecting said gathering mechanism into a furnace to make a gather of glass, means for arresting the angular travel of said gathering mechanism with the rotating frame during the gathering period without arresting the rotating frame, means for returning the gathering mechanism to its original position, in which position it is directly above the gather support, means for supporting the upper end of the gather during elongation, means for releasing the body in the lower end of the gather whereby it is permitted to elongate by gravity until it contacts with said gather support, and means for admitting air under pressure into the gather during elongation.

6. The combination with automatically actuated suction molds comprising means for supporting the upper end of the gather of glass gathered therein, of power driven means actuated in regular time and order and at a predetermined speed to engage the lower end of the gather only after a predetermined elongation by gravity, and to thereafter descend at such predetermined speed so as to support the lower end of the gather during elongation without retarding such elongation to such extent as to distort the gather, and means for automatically admitting air under pressure into the gather during elongation.

7. The process of making glass cylinders and similar articles, which comprises gathering a body of molten glass by suction into inclosing metal molds, whereby the entire surface of the gather is chilled, supporting the upper end of the gather and releasing the body thereof whereby the gather hangs free and will elongate by gravity, automatically admitting air under pressure into the gather during elongation, engaging the lower end of the gather by mechanical support after a predetermined elongation, and thereafter lowering said mechanical support while supporting the lower end of the gather at such predetermined regular speed as shall prevent too rapid elongation by gravity but without retarding such elongation so as to distort the gather and simultaneously admitting air under pressure in such volume as is necessary to develop the gather in desired form.

8. In a machine for making glass articles, the combination with a reciprocating ram, of a mold carried thereon comprising an upper mold element, a lever on one end of which said upper mold element is sustained, and a cam against which the other end of said lever is brought by the movement of said ram whereby the lever is rocked and said top mold element raised.

AUGUST KADOW.

Witnesses:
GEORGE E. DIXON,
L. F. LUSCOMBE.

---

It is hereby certified that in Letters Patent No. 1,191,317, granted July 18, 1916, upon the application of August Kadow, of Toledo, Ohio, for an improvement in "Machines for Making Glass Cylinders," an error appears in the printed specification requiring correction as follows: Page 3, line 86, for the reference-numeral "11" read *111;* and that the said Letters Patent should be read with this correction therein that the same may conform to the record of the case in the Patent Office.

Signed and sealed this 15th day of August, A. D., 1916.

[SEAL.]

F. W. H. CLAY,

*Acting Commissioner of Patents.*

Cl. 49—1.

It is hereby certified that in Letters Patent No. 1,191,317, granted July 18, 1916, upon the application of August Kadow, of Toledo, Ohio, for an improvement in "Machines for Making Glass Cylinders," an error appears in the printed specification requiring correction as follows: Page 3, line 86, for the reference-numeral "11" read *111;* and that the said Letters Patent should be read with this correction therein that the same may conform to the record of the case in the Patent Office.

Signed and sealed this 15th day of August, A. D., 1916.

[SEAL.]

F. W. H. CLAY,

*Acting Commissioner of Patents.*

Cl. 49—1.